Aug. 3, 1954     M. W. HORRELL     2,685,670
SPEED REGULATING CIRCUIT FOR GENERATORS
Filed May 15, 1950
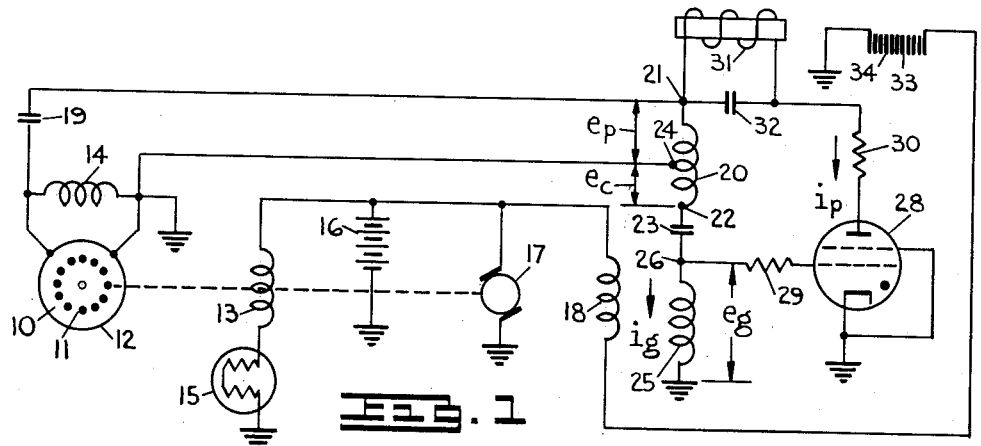
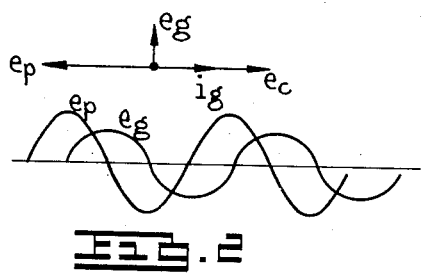
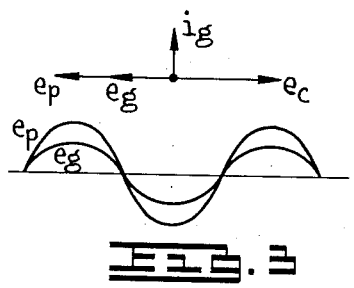
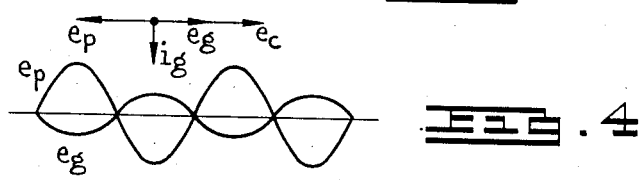
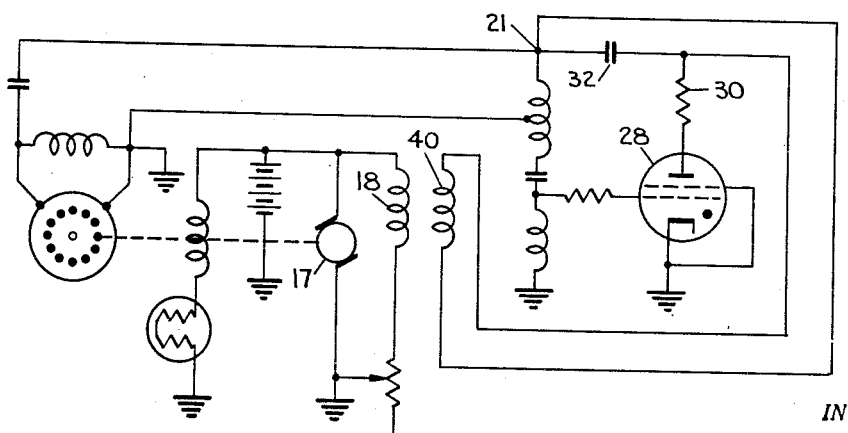
INVENTOR.
MAURICE W. HORRELL
BY
ATTORNEY Patented Aug. 3, 1954

2,685,670

UNITED STATES PATENT OFFICE 2,685,670

SPEED REGULATING CIRCUIT FOR GENERATORS

Maurice W. Horrell, Detroit, Mich., assignor, by mesne assignments, to the United States of America as represented by the United States Atomic Energy Commission Application May 15, 1950, Serial No. 162,029

8 Claims. (Cl. 322—32)

This invention relates to electrical circuits for regulating the speed of an alternator and more particularly to electrical circuits for providing a sensitive control to maintain the speed of an alternator substantially constant. The invention utilizes the phase shift of a control voltage to maintain a substantially constant alternator speed.

In many applications, an alternator, such as an induction generator, is used as a power source to supply an alternating voltage for the operation of various components. In such applications, the frequency of the voltage supplied by the alternator may change for various reasons, such as changes in the load imposed upon the motor which drives the alternator or changes in the excitation of the motor field windings. Often, however, it is important to maintain the frequency of the supply voltage substantially constant.

This invention provides circuits for regulating the speed of an alternator so that the frequency of the voltage from the alternator will be substantially constant. The invention employs an inductance and capacitance which are resonant at the desired frequency. The current through the inductance and capacitance varies in time phase as the speed of the alternator changes from the desired value and this shift in phase is employed to vary the conduction period of a thyratron tube. By varying the conduction period of the thyratron tube, the current through the field winding of the motor which drives the alternator is varied so as to return the motor to the desired speed.

An object of this invention is to provide electrical circuits for regulating the speed of an alternator.

Another object is to provide electrical circuits of the above indicated character for sensitively controlling the speed of an alternator.

A further object is to provide a circuit of the above indicated character for returning an alternator to a predetermined speed quickly, efficiently and with a minimum amount of hunting whenever the speed of the alternator varies from the desired value.

Still another object is to provide a circuit of the above indicated character for maintaining the speed of an alternator constant by varying the phase of a control voltage.

A still further object is to provide a circuit of the above indicated character for maintaining the speed of an alternator constant regardless of any changes in the voltage applied to the motor which drives the alternator.

Other objects and advantages of the invention will be apparent from a detailed description of the invention and from the appended drawings and claims.

In the drawings:

Figure 1 is a circuit diagram of one embodiment of the invention;

Figure 2 illustrates by vectors and waveforms the phase relationships of various voltages and currents in the circuit shown in Figure 1 when the alternator has the desired speed;

Figure 3 illustrates by vectors and waveforms the phase relationships of the voltages and currents illustrated in Figure 2 when the alternator has a speed below the desired value;

Figure 4 illustrates by vectors and waveforms the phase relationships of the voltages and currents illustrated in Figures 2 and 3 when the alternator has a speed above the desired value; and Figure 5 is a circuit diagram of another embodiment of the invention.

In the embodiment of the invention shown in Figure 1, an alternator, such as an induction generator 10, is provided. The generator 10 has a notched rotor 11 and a stator 12, on which is wound a balanced field winding 13 and an output winding 14. The field winding 13 is connected through a ballast lamp 15 to ground, the lamp 15 providing a rough control for regulating the current through the winding. The winding is supplied with direct voltage from a suitable power supply, such as a battery 16, the negative terminal of which is grounded. In addition to being connected to the field winding 13, the battery 16 is connected to the rotor 17 of a suitable motor, such as a shunt motor, one side of the rotor being grounded. A field winding 18 of the shunt motor is also connected to the positive terminal of the battery 16.

The output winding 14 of the induction generator 10 is connected at one side to a capacitance 19 and is grounded at the other side. One side of an autotransformer 20 is connected at a terminal 21 to the capacitance 19 and the other side of the autotransformer is connected at a terminal 22 to a capacitance 23. The autotransformer is grounded at an intermediate terminal 24, which is so located in the autotransformer as to provide a relatively small voltage, designated as $e_c$, between the terminals 24 and 22 as compared to the voltage, designated as $e_p$, between the terminals 24 and 21. An inductance 25 is connected at a terminal 26 to the capacitance 23 and is grounded at the other end.

The control grid of a thyratron tube 28, which serves as a switch and an amplifier, is connected through a resistance 29 to the terminal 26. The resistance 29 isolates the inductance 25 from the tube 28 and prevents the "Q" of the inductance— i. e.; the ratio between the reactance of the inductance and the effective resistance of the inductance—from being materially affected when the tube 28 conducts. The cathode and shield grid of the thyratron tube are grounded and the plate is connected to a resistance 30, which limits the peak current through the tube. A solenoid winding 31 is connected between the terminal 21 of the autotransformer 20 and the resistance 30. A capacitance 32 is provided across the solenoid winding 31 to smooth the current through the winding, and a carbon pile regulator 33 is located in the field of the solenoid winding 31. The carbon pile regulator 33 has a plurality of discs 34 which are expansible relative to one another when actuated by the solenoid so as to increase the resistance of the regulator. The carbon pile regulator is connected at one end to the field winding 18 of the shunt motor and is grounded at the other end.

The capacitance 23 and inductance 25 form a series resonant circuit when the induction rotor 11 is rotating at the desired speed. At this speed, the current, designated as $i_g$, which flows from the autotransformer 20 through the capacitance 23 and inductance 25 is approximately in phase with the control voltage $e_c$ between the terminals 24 and 22 and is approximately 180° out of phase with respect to the voltage $e_p$ between the terminals 24 and 21. Since the current through an inductance lags the voltage across the inductance by 90°, the voltage at the terminal 26, designated as $e_g$, leads the voltage $e_p$ at the terminal 21 by approximately 90°. This phase relationship between the voltages on the grid and plate of the tube 28 causes a current, designated as $i_p$, to flow through the tube for approximately 90° of each alternating cycle. The current $i_p$, when averaged over a complete cycle of alternating voltage by the capacitance 32, causes the discs 34 of the regulator 33 to expand through an intermediate distance relative to one another. The resultant resistance provided by the regulator 33 limits the current flowing through the field winding 18 to a value which maintains the rotor 17 at the desired speed. The phase relationships between the currents and voltages described above are illustrated in Figure 2.

The phase relationships of the above voltages and currents are illustrated in Figure 3 when the alternator 10 is rotating below the desired speed. At such speeds, the reactance of the capacitance 23 exceeds the reactance of the inductance 25. This causes the current $i_g$ flowing through the capacitance 23 and the inductance 25 to lead by approximately 90° the voltage $e_c$ between the terminals 24 and 22. Since the voltage $e_g$ at the terminal 26 leads the current $i_g$ by approximately 90°, the voltage $e_g$ is approximately 180° out of phase with the voltage $e_c$ at the terminal 22 and therefore approximately in phase with the voltage $e_p$ at the terminal 21. This phase relationship between the voltages $e_g$ and $e_p$ causes a current $i_p$ to flow through the tube 28 for approximately 180° of each alternating cycle. The increase in the average current through the solenoid 31 produces an increase in the resistance of the carbon pile regulator 33 above the value which it has when the alternator is rotating at the desired speed. As a result, the current through the field winding 18 decreases and the speed of the rotor 17, being inversely proportional to the excitation of the field winding 18, increases until the rotor is rotating at the desired speed.

When the frequency of the output voltage from the induction generator 10 is above the desired value, the reactance of the inductance 25 exceeds the reactance of the capacitance 23. This causes the current $i_g$ flowing through the capacitance 23 and inductance 25 to lag the voltage $e_c$ at the terminal 22 by approximately 90° and therefore to lead the voltage $e_p$ at the terminal 21 by approximately 90°. The voltage $e_g$ at the terminal 26 in turn leads the current $i_g$ by approximately 90°, producing approximately a 180° phase shift between the voltages $e_g$ and $e_p$. As a result, substantially no current flows through the tube 28 and the resistance of the carbon pile regulator decreases. The increased current through the field winding 18 causes the speed of the rotor 17 to decrease until the desired speed has been reached.

Since the phase relationship between the voltages on the grid and plate of the tube 28 shifts by approximately 90° when the speed of the alternator increases or decreases from the desired value, a sensitive control is provided for regulating the speed of the alternator. This sensitivity is further sharpened by the amplification provided by the tube 28. The regulation of the alternator speed does not require a critical adjustment of the carbon pile regulator 33 or any other member for proper operation. As a result of the above advantages, changes of as much as 20% in the voltage on the battery 16 or in the load on the alternator produce a variation of less than 1% in the speed of the alternator.

Another embodiment of the invention is shown in Figure 5. In this embodiment, the field winding 18 and an auxiliary field winding 40 are wound on the stator. The winding 40 is connected at one end to the resistance 30 and at the other end to the terminal 21. The capacitance 32 is provided in parallel with the winding 40.

A relatively large amount of magnetic flux is produced by the current in the winding 18. Thus, if magnetic flux were produced only by the winding 18, the rotor would run below the desired speed. However, the current which flows through the winding 40 produces magnetic flux polarized to oppose the flux produced by the winding 18. The bucking action offered by the winding is intermediate when the rotor 17 is rotating at the proper speed and the resultant flux in the motor maintains the rotor speed constant. When the rotor 17 is rotating at a speed below the desired value, the current through the winding 40 increases and causes the total flux in the motor to decrease. As a result, the motor speed increases. Likewise, when the rotor is running below the desired speed, the magnetic opposition of the winding 40 decreases below the intermediate value and the total magnetic flux in the motor increases, causing the speed of the motor to decrease.

There are thus provided electrical circuits for sensitively controlling the speed of an alternator by varying the phase of a control voltage. The circuits maintain the speed of the alternator constant regardless of changes in circuit parameters, such as changes in power supply voltages.

Although this invention has been disclosed and illustrated with reference to particular applicanumerous other applications which will be apparent to persons skilled in the art. The invention is, therefore, to be limited only as indicated by the scope of the appended claims.

What is claimed is:

1. Apparatus for maintaining an alternator substantially at a predetermined speed, including, means connected to the alternator to provide a voltage having a phase opposed to the phase of the alternator voltage, a resonant circuit, including an inductance and capacitance, connected to the last-named means, the circuit being resonant at the predetermined speed and being adapted to provide a voltage having an instantaneous phase shift relative to the alternator voltage when the alternator speed varies from the desired value, and means associated with the resonant circuit for adjusting the speed of the alternator in accordance with the relative phase shift between the voltage from the resonant circuit and the voltage applied from the alternator.

2. Apparatus for maintaining an alternator substantially at a predetermined speed, including, a motor for driving the alternator, means connected to the alternator to provide a first voltage in phase with the voltage from the alternator and a second voltage having a phase opposed to the phase of the alternator voltage, a resonant circuit, including an inductance and a capacitance, connected to the last-named means, the circuit being resonant at the predetermined speed and being adapted to provide a voltage having an instantaneous phase shift relative to the second voltage when the alternator speed varies from the desired value, a gas-filled tube having a plate, a grid and a cathode, the grid of the tube being connected to the inductance and to the capacitance and the plate of the tube being adapted to receive the first voltage so as to produce a conduction of the tube for a period of time dependent upon the relative phase of the voltages on the grid and plate, a solenoid energized in accordance with the average flow of current through the tube, and means operative by the solenoid to oppose the rotation of the motor with a strength dependent upon the energization of the solenoid.

3. Apparatus for maintaining an alternator substantially at a predetermined speed, including, means connected to the alternator to provide a voltage having a phase opposed to the phase of the alternator voltage, a resonant circuit, including an inductance and capacitance, connected to the last-named means, the circuit being resonant at the predetermined speed and being adapted to provide a voltage having an instantaneous phase shift relative to the alternator voltage when the alternator speed varies from the desired value, a switch connected to the inductance and to the capacitance and adapted to be closed in each cycle of alternating voltage for a period of time determined by the relative phase between the alternator voltage and the voltage provided by the resonant circuit, and means associated with the switch for adjusting the speed of the alternator in accordance with the period of time in which the switch is closed.

4. Apparatus for maintaining an alternator substantially at a predetermined speed, including, a motor for driving the alternator, a field winding in the motor adapted to change the speed of the motor in accordance with variations in its excitation, an autotransformer connected to the alternator to provide a first voltage in phase with the alternator voltage and a second voltage having a phase opposed to that of the alternator voltage, a circuit, including an inductance and capacitance, resonant at a frequency corresponding to the predetermined speed and energized by the second voltage, a tube having a grid and a plate, the first voltage being applied to the plate, the inductance and the capacitance being connected to the grid to introduce a voltage having a variable phase relationship, with respect to the plate voltage, with changes in the motor speed, and means responsive to the variable phase relationship for adjusting the excitation of the field winding.

5. Apparatus for maintaining an alternator substantially at a predetermined speed, including, a motor for driving the alternator, a field winding in the motor adapted to change the speed of the motor in accordance with variations in its excitation, means connected to the alternator to provide first and second voltages of opposite phase, a resonant circuit, including an inductance and capacitance, adapted to be energized by the first voltage, the circuit being resonant at the predetermined speed, a tube having a grid and plate, the second voltage being applied to the plate, the inductance and the capacitance being connected to the grid to introduce a voltage having a variable phase relationship, relative to the plate voltage, with changes in the motor speed, and means responsive to the variable phase relationship for adjusting the excitation of the field winding.

6. Apparatus for maintaining an alternator substantially at a predetermined speed, including, a motor for driving the alternator, a field winding in the motor adapted to vary the speed of the motor in accordance with variations in its excitation, means connected to the alternator to provide first and second voltages of opposite phase, a series circuit, including an inductance and capacitance, resonant at the predetermined speed and energized by the first voltage, a gas-filled tube having a grid and a plate, the second voltage being applied to the plate, the inductance and the capacitance being connected to the grid to introduce a voltage having a variable phase relationship, relative to the plate voltage, with changes in the motor speed, and a reactance responsive to the change in the tube current resulting from the variable phase relationship, the reactance being associated with the field winding to adjust the excitation of the field winding.

7. Apparatus for maintaining an alternator substantially at a predetermined speed, including, a motor for driving the alternator, means connected to the alternator to provide a voltage having a phase opposed to the phase of the alternator voltage, a resonant circuit, including an inductance and capacitance, connected to the last-named means, the circuit being resonant at the predetermined speed and being adapted to provide a voltage having an instantaneous phase shift relative to the alternator voltage when the alternator speed varies from the desired value, a solenoid energized in accordance with the relative phase shift, and means actuated by the solenoid and connected to the motor for opposing the rotation of the motor with a strength dependent upon the energization of the solenoid.

8. Apparatus for maintaining an alternator substantially at a predetermined speed, including, a motor for driving the alternator, a field winding in the motor adapted to change the speed of the motor in accordance with variations in its excitation, an autotransformer connected to the alternator to provide a first voltage in phase with the alternator voltage and a second voltage having a phase opposed to that of the alternator voltage, a circuit, including an inductance and capacitance, resonant at a frequency corresponding to the predetermined speed and energized by the second voltage, a tube having a grid and a plate, the first voltage being applied to the plate, the inductance and the capacitance being connected to the grid to introduce a voltage having a variable phase relationship, with respect to the plate voltage, with changes in the motor speed, and a reactance responsive to the change in the tube current resulting from the variable phase relationship and operative to adjust the excitation of the field winding in accordance with the current flowing through it.

References Cited in the file of this patent

UNITED STATES PATENTS

| Number | Name | Date |
|---|---|---|
| 1,807,190 | Bock et al. | May 26, 1931 |
| 1,861,550 | Rea | June 7, 1932 |
| 1,981,040 | Gulliksen | Nov. 20, 1934 |
| 2,001,557 | Von Ohlsen | May 14, 1935 |
| 2,067,500 | Morton | Jan. 12, 1937 |
| 2,521,639 | Lauricella et al. | Sept. 5, 1950 |
| 2,558,572 | Logan | June 26, 1951 |